No. 886,093. PATENTED APR. 28, 1908.
G. E. TITCOMB.
CONTACT POST SYSTEM FOR TRANSMITTING ELECTRIC POWER.
APPLICATION FILED FEB. 29, 1908.
5 SHEETS—SHEET 1.
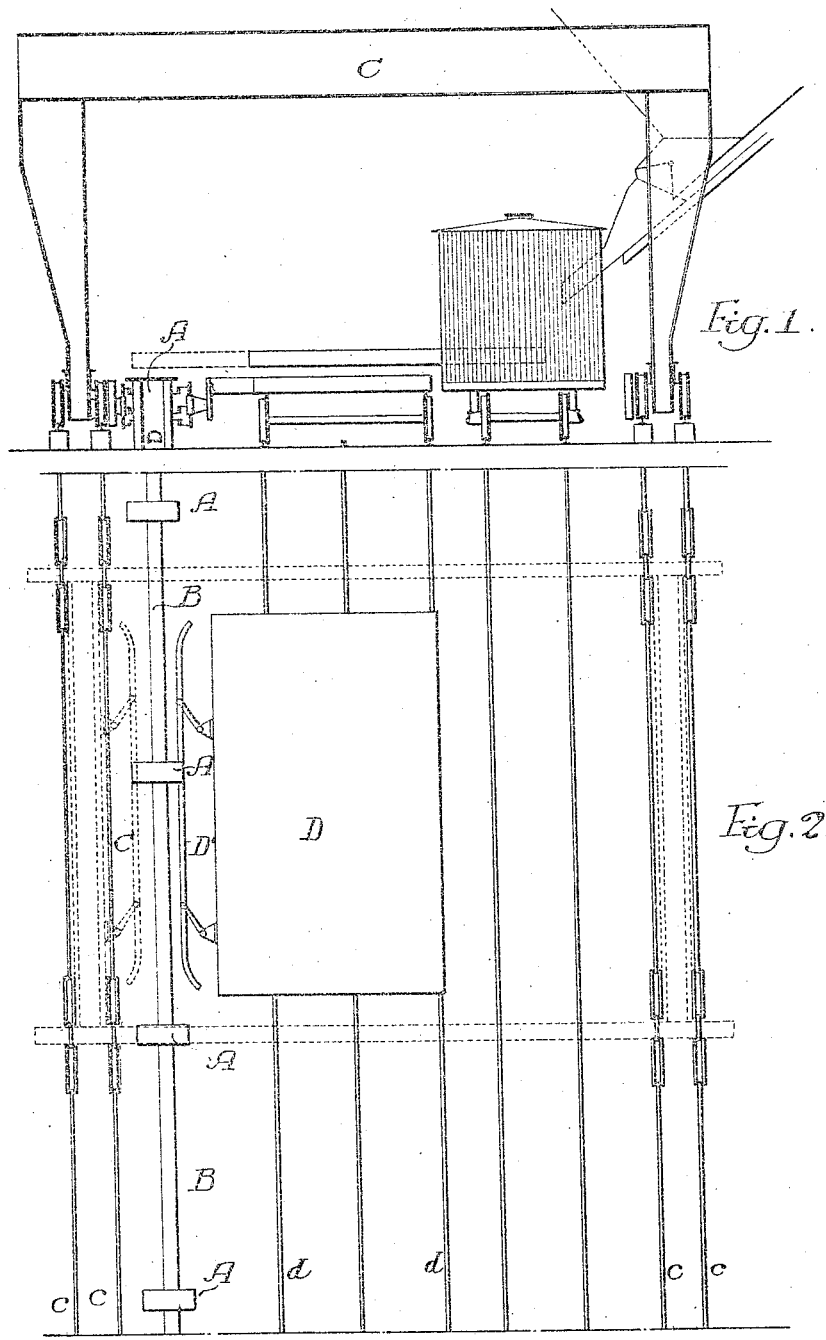

No. 886,093. PATENTED APR. 28, 1908.
G. E. TITCOMB.
CONTACT POST SYSTEM FOR TRANSMITTING ELECTRIC POWER.
APPLICATION FILED FEB. 29, 1908.
5 SHEETS—SHEET 2.
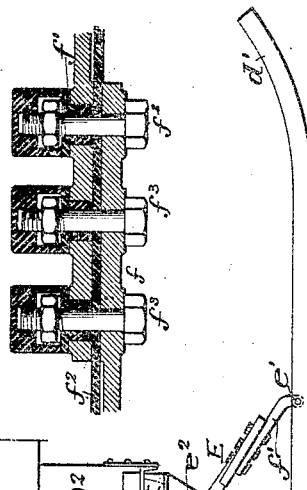
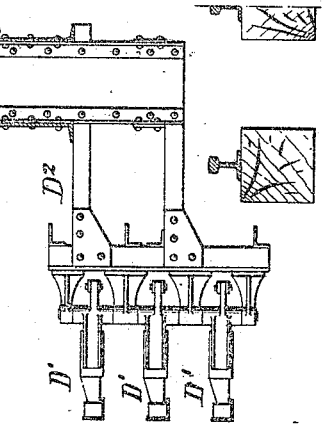
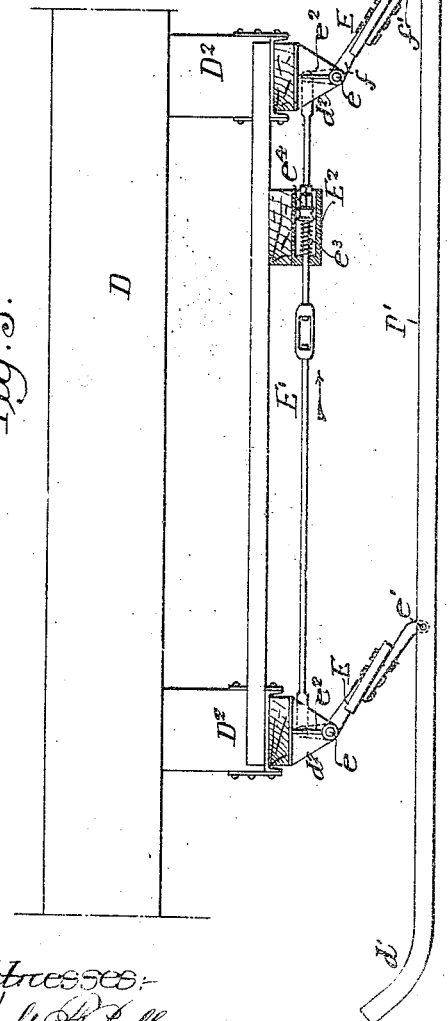
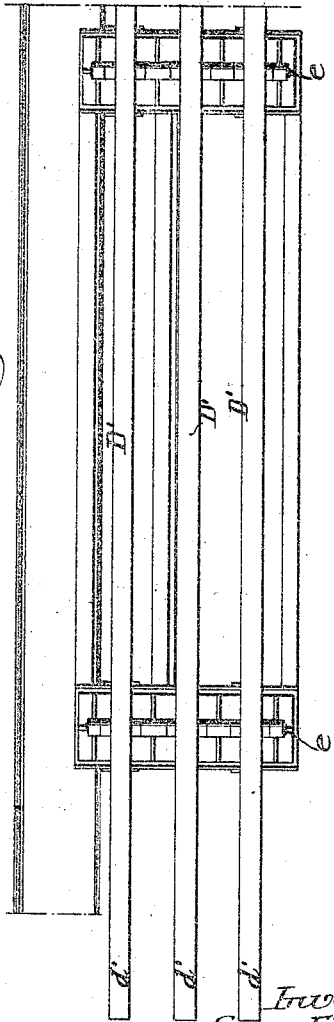
Witnesses:
Walter R. Pullinger
Augustus R. Peppes
Inventor
George E. Titcomb
by his Attorneys
Howson & Howson

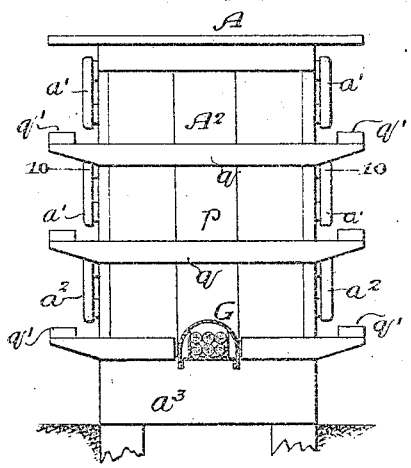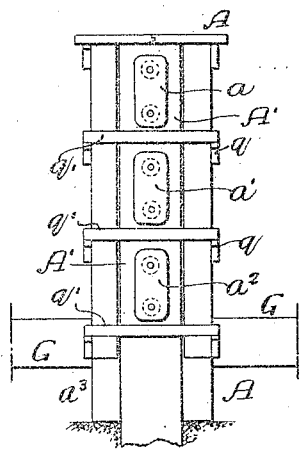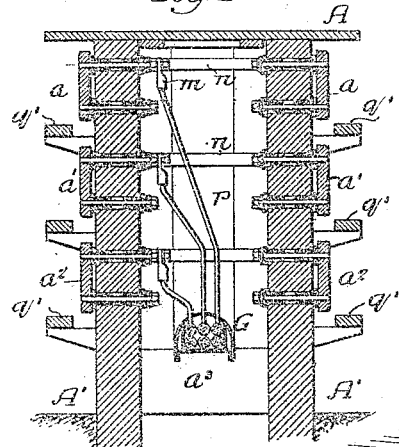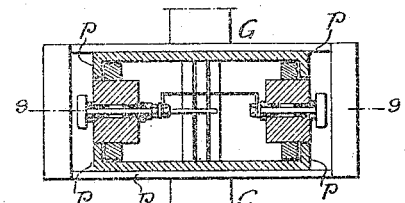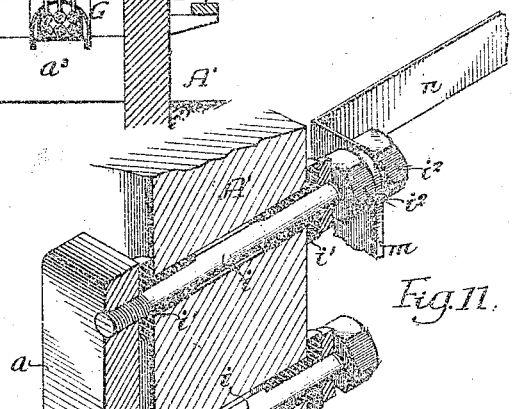

No. 886,093.  
G. E. TITCOMB.  
CONTACT POST SYSTEM FOR TRANSMITTING ELECTRIC POWER.  
APPLICATION FILED FEB. 29, 1908.
PATENTED APR. 28, 1908.
5 SHEETS—SHEET 4.
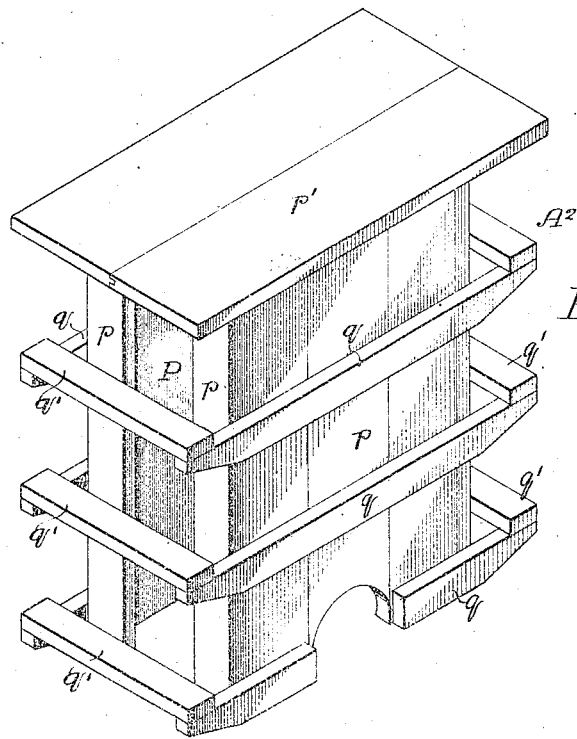
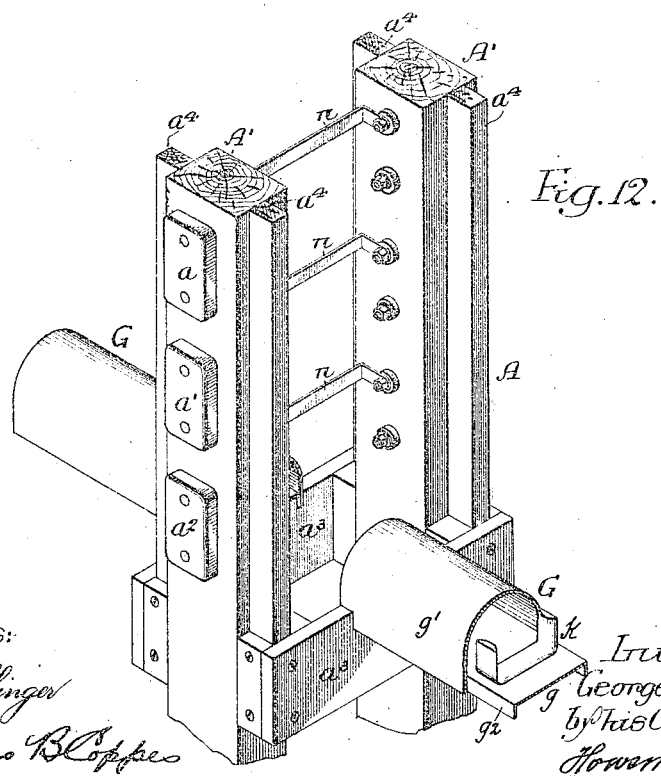

No. 886,093. PATENTED APR. 28, 1908.
G. E. TITCOMB.
CONTACT POST SYSTEM FOR TRANSMITTING ELECTRIC POWER.
APPLICATION FILED FEB. 29, 1908.

5 SHEETS—SHEET 5.

Witnesses
Walter Pullinger
Augustus B. Coppes

Inventor
George E. Titcomb
by his Attorneys
Howson & Howson

UNITED STATES PATENT OFFICE.

GEORGE E. TITCOMB, OF PHILADELPHIA, PENNSYLVANIA, ASSIGNOR TO DODGE COAL STORAGE COMPANY, OF NAUGATUCK, CONNECTICUT, A CORPORATION OF CONNECTICUT.

CONTACT-POST SYSTEM FOR TRANSMITTING ELECTRIC POWER

No. 886,093.　　　　Specification of Letters Patent.　　　Patented April 28, 1908.

Application filed February 29, 1908. Serial No. 418,534.

*To all whom it may concern:*

Be it known that I, GEORGE E. TITCOMB, a citizen of the United States, residing in Philadelphia, Pennsylvania, have invented certain Improvements in Contact-Post Systems for Transmitting Electric Power, of which the following is a specification.

My invention relates to certain improvements in means for transmitting electric power to cars, tramways and similar devices.

The object of my invention is to substitute contact posts for the third rail or trolley wire, particularly in view of the fact that the available electric power for operating machinery is a three-phase alternating current and requires three conductors, while ordinary direct current or single-phase alternating current only requires one conductor and the current is returned through the track rails. Therefore, I have devised a system in which contact posts are used, which can be readily installed and in which the coverings and protectors can be removed so that access can be had to the wires.

Figure 14:
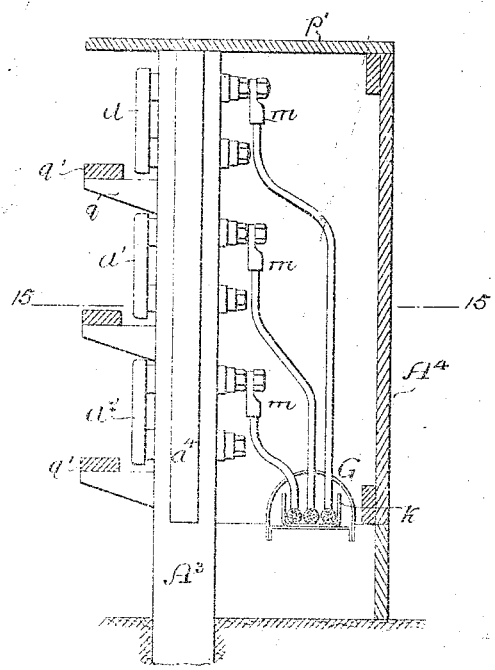
Figure 15:
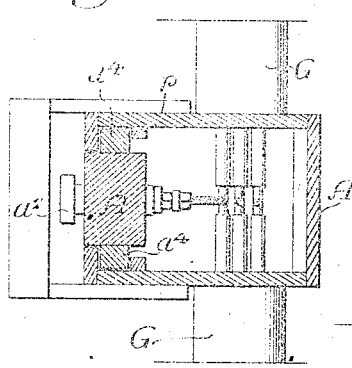
Figure 16:
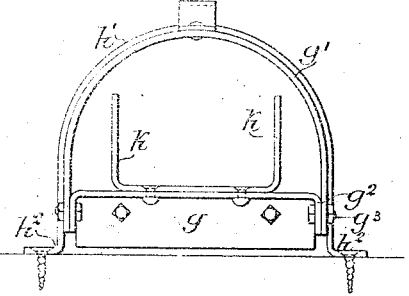
Figure 17:
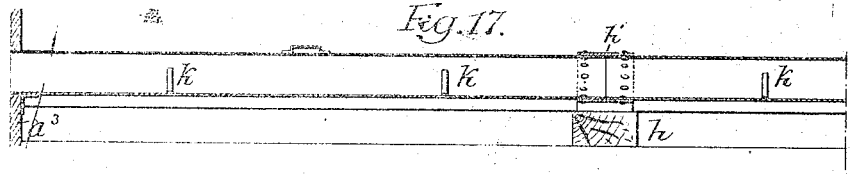

In the accompanying drawings:—Figure 1, is a view in elevation showing my invention in connection with a bridge tramway and loading car; Fig. 2, is a plan view of Fig. 1; Fig. 3, is a plan view illustrating the contact shoe attached to the car or other moving element; Fig. 4, is a side view of Fig. 3, partly broken away; Fig. 5, is an end view of Fig. 3; Fig. 6, is a detached sectional view showing the insulation between the shoe and the brackets on the car; Fig. 7, is a view in elevation of a double contact post showing the conduit in section; Fig. 8, is an end view of Fig. 7; Fig. 9, is a sectional view on the line 9—9, Fig. 10; Fig. 10, is a sectional view on the line 10—10, Fig. 7; Fig. 11, is an enlarged view showing the contacts of the post; Fig. 12, is a perspective view of the contact posts with the protecting casing removed; Fig. 13, is a perspective view of the casing; Fig. 14, is a sectional view of a single post; Fig. 15, is a sectional plan view on the line 15—15, Fig. 14; Fig. 16, is a transverse sectional view of the conduit; and Fig. 17, is a longitudinal sectional view of the conduit.

Referring in the first instance to Figs. 1 and 2, A, A are the contact posts, B, B are the conduits extending from one post to another, C is a bridge tram, in the present instance having a shoe C' adapted to contact with the terminals on one side of the posts A, and D is a loading car having a shoe D' arranged to bear against contacts on the opposite side of the posts A. The bridge tram is adapted to tracks c, c extending parallel with the conduits and the loading car is adapted to tracks d, d. This is simply one plan of using my contact system and it will be understood that in place of the bridge crane an ordinary boom crane may be used, or any car for carrying material from one point to another may be substituted for the loading car and the contacts may be all on one side as in Fig. 14, or on both sides of the posts as in Fig. 9, and there may be as many contacts as desired, according to the system used.

In Figs. 3 to 5, both inclusive, I have shown the form of contact I prefer to use. D is a car, as shown in Fig. 1, and D' is the contact shoe turned up at each end d' so as to readily pass from one contact to another without interfering, and in the present instance, as shown in Fig. 4, there are three contact shoes D', one directly below another so as to aline with the contacts $a$, $a'$, $a^2$ on the posts A. These contacts are supported by brackets $D^2$ projecting from the side of the car, as shown in Fig. 5, and are pivoted to the brackets through two series of pivoted arms E, E mounted on vertical pivots $e$ on extensions $d^2$ of the brackets $D^2$. These arms are pivoted at $e'$ to the shoes, as clearly shown in Fig. 3, and have extensions $e^2$ which are connected by a rod E' mounted in a spring box $E^2$. A spring $e^3$ bearing upon a head $e^4$ on the rod tends to force the rod in the direction of the arrow, Fig. 3, which in turn forces the shoes D' out from the car and against the contacts on the posts A. Thus the shoes are held in yielding contact with the posts.

I insulate the contacts from the car body as illustrated in Fig. 6; the arms E are made in two parts $f$, $f'$ and between these parts is a sheet of nonconductor $f^2$ of fiber or other material, and the bolts $f^3$, which secure the parts together, are inclosed in nonconducting bushings and caps as illustrated in said figure, although this construction may be modified without departing from my invention.

In the drawings I have not shown the mechanism to which the current is carried from the shoes as it may be conducted in any suitable manner and any type of motor may be used without departing from the essential features of the invention.

One of the essential features of my invention is the construction of the contact posts and the conduits extending from one of the posts to another, and the method of protecting the wires and so constructing the mechanism that access can be readily had to the conduits and the wires.

Figs. 7 to 13, both inclusive, show a double contact post, while Figs. 14 and 15 show a single contact post. Referring to Figs. 7 to 13, both inclusive, in the first instance, $A'$, $A'$ are two uprights planted firmly in the ground; these uprights are firmly secured together at the ground by cross pieces $a^3$ and on each side of the uprights are ribs $a^4$ acting as guides for the cover $A^2$, shown detached in Fig. 13. On the two uprights $A'$ are the contact plates $a$, $a'$, $a^2$, one directly below another on each post, as illustrated in Figs. 9 and 12. Each contact is made as shown in the perspective view, Fig. 11, and consists of two rods $i$, $i$ which extend through openings in the posts $A'$, and these rods pass through nonconducting headed sleeves $i'$ at each side and the rods are screwed into the contact plates $a$. At the opposite end are nuts $i^2$ between which the terminals $m$ are clamped; $n$, $n$ are conductors extending from a terminal on one post to a terminal on the other post, as shown in detail in the drawings, so that only one set of terminals is required for the two sets of contacts. It will be noticed that there are two bolts for each contact plate and only one of these bolts is a conductor, being attached to the terminal $m$. The posts A are placed a given distance apart and extending from one post to another is a conduit G consisting of a bottom plate $g$ and a semi-circular cover plate $g'$ secured to a depending flange $g^2$ of the bottom plate by bolts $g^3$, Figs. 16 and 17. These conduits are supported at the posts by the transverse members $a^3$ and are supported at intervals by foundation members $h$. An arched section $h'$ is secured to two abutting sections of the conduit as illustrated in Fig. 17, and extends down below the conduit to form feet $h^2$ which rest upon and are secured to the foundations $h$, making a very substantial support for the wires.

In order to hold the wires on the bottom plate I secure to it at intervals U-shaped members $k$ and between the upright arms of these members the wires are placed, as shown in Figs. 7 and 9. Thus the cover $g'$ can be removed without disturbing the position of the wires, leaving the wires exposed between the two posts and when the cover and protector $A^2$ is lifted from the posts, as in Figs. 12 and 13, all the terminals and contact plates of the posts are exposed so that access can be readily had to all parts of the conducting mechanism, yet when the parts are in place they are protected against moisture and guards are provided to prevent any person coming in accidental contact with any of the terminals. The cover $A^2$ is preferably made as shown in Fig. 13 and consists of two side sections P, P of wood, which have flanges $p$ fitting over the ribs $a^4$ on the uprights $A'$, and a top $P'$ considerably greater in width and length than the distance between the uprights, so as to extend over and protect the contacts $a$. Secured to the side sections P are strips of wood $q$ extending beyond each end, as shown in Fig. 13, and secured to these strips are guard strips $q'$, one mounted between each contact $a$, $a'$ $a^2$. These guards are so proportioned that the shoes $D'$ will clear them, yet they will prevent any one touching the contacts. The entire cover is so assembled that it can be removed as a unit, as illustrated in Fig. 13.

In Figs. 14 and 15, I have shown a single post $A^3$ to which is attached a single row of contacts $a$, $a'$, $a^2$, one mounted below another, and a cover $A^4$ having the guards and top plate and adapted to inclose the terminals and conductors.

The above described invention is particularly adapted for use in storage yards of manufacturing establishments, or terminals of railways where it is desired to load or unload materials, using electric power for the purpose and taking the place of the dangerous third rail or the trolley wire, which is objectionable as it is desirable to have the overhead clear of any obstructions, and on account of the available electric power for operating machinery being three-phase alternating current it requires three conductors while in the ordinary direct current or single phase alternating current only one conductor is used and the current is returned through the track rails, therefore, my improved post contact system is particularly adapted to the three-phase alternating current.

The posts are so situated one in respect to the other and the shoes on the cars or cranes are so designed that the shoes will always be in contact with at least one post, the posts being set far enough apart to allow for the driving of teams across the tracks at any point and the shifting of material across the tracks at any point.

I claim:—

1. The combination in a system for transmitting electric power, of a series of posts spaced a given distance apart and having contacts, conduits extending from one post to another, a moving element having a shoe arranged to bear against the contacts of the posts, removable covers for the posts, and removable covers for the conduits so that on removing the covers the wires and terminals are exposed.

2. The combination of a series of posts spaced a given distance apart, conduits extending from one post to another, conducting wires arranged in the conduits, removable covers for the conduits, a series of contacts mounted on the posts, terminals attached to the contacts and connected to the wires in the conduits, and a cover detachably mounted over the posts and acting as a protector for the terminals and as a guard for the contacts.

3. The combination in a post contact system for transmitting electric current, of a series of uprights arranged a given distance apart, conduits extending from one upright to another, a series of contact plates, one mounted above another on one side of each post, bolts extending through the posts from the contacts, terminals attached to the bolts, and conductors extending from the terminals to wires in the conduits.

4. The combination of a series of contact posts spaced a given distance apart, each contact post consisting of two uprights, a series of contact plates mounted one above another on the outside of each upright, bolts extending through the uprights and connected to the contacts, conductors extending from the bolt on one upright to the bolt on the other upright, and terminals connected to one set of bolts and to the wires in the conduit.

5. The combination of a series of posts arranged a given distance apart, conduits extending from one post to another, a series of contacts on the posts connected to wires in the conduits, a detachable cover having side members and a top, and guards projecting between each contact.

6. The combination of a series of posts spaced a given distance apart, conduits extending from one post to another, wires in the conduits, contacts on the posts, conductors extending from the contacts to the wires in the conduits, guides on the posts, a detachable cover adapted to the guides, said cover consisting of side members, a top, a series of bars secured to each side of the cover and extending beyond the ends of the cover, and transverse guards on the bars projecting between each contact, the entire cover being removable.

7. The combination of a series of contact posts, contacts thereon, a conduit extending from one post to another, said conduit having a bottom plate with U-shaped bars secured thereto, the upturned ends of the bars confining wires or cables on the conduit, and a detachable cover plate secured to the bottom plate and inclosing the wires.

8. The combination of a series of contact posts having contacts thereon, a conduit extending from one post to another and having a bottom plate with downwardly extending flanges at each side, means for retaining the wires on the bottom plate, an arched cover plate, and bolts securing the cover plate to the downwardly extending flanges of the bottom plate.

9. The combination of a series of contact posts, contacts thereon, a conduit extending from one post to another, each conduit having a bottom plate with turned down flanges, means for holding the wires or cables on the bottom plate, a cover plate having its lower edges secured to the downwardly extending flanges of the bottom plate, and supporting sections arranged at intervals between the posts and secured to the cover plate having feet resting upon supports and carrying the conduit.

In testimony whereof, I have signed my name to this specification, in the presence of two subscribing witnesses.

GEORGE E. TITCOMB.

Witnesses:
Jos. H. KLEIN,
WM. A. BARR.